United States Patent
Marmolejo-Meillon et al.

(10) Patent No.: US 9,167,053 B2
(45) Date of Patent: Oct. 20, 2015

(54) ADVANCED NETWORK CHARACTERIZATION

(75) Inventors: Luis G. Marmolejo-Meillon, San Jose, CA (US); Barbara Nelson, San Mateo, CA (US)

(73) Assignee: iPass Inc., Redwood Shores, CA (US)

( * ) Notice: Subject to any disclaimer, the term of this patent is extended or adjusted under 35 U.S.C. 154(b) by 240 days.

(21) Appl. No.: 13/004,821

(22) Filed: Jan. 11, 2011

(65) Prior Publication Data

US 2011/0208866 A1 Aug. 25, 2011

Related U.S. Application Data

(63) Continuation-in-part of application No. 11/239,707, filed on Sep. 29, 2005.

(51) Int. Cl.
  *H04L 29/06* (2006.01)
  *H04L 29/08* (2006.01)
  *H04W 12/06* (2009.01)
  *H04W 48/08* (2009.01)
  *H04W 48/16* (2009.01)
  *H04W 48/18* (2009.01)

(52) U.S. Cl.
  CPC ............ *H04L 67/36* (2013.01); *H04L 63/0823* (2013.01); *H04L 63/126* (2013.01); *H04L 63/205* (2013.01); *H04L 67/04* (2013.01); *H04L 69/18* (2013.01); *H04W 12/06* (2013.01); *H04L 69/24* (2013.01); *H04W 48/08* (2013.01); *H04W 48/16* (2013.01); *H04W 48/18* (2013.01)

(58) Field of Classification Search
  CPC .................................................. H04L 63/1441

USPC ......... 709/227, 223, 224, 226; 726/12, 22, 23
See application file for complete search history.

(56) References Cited

U.S. PATENT DOCUMENTS

| 5,774,525 | A | * | 6/1998 | Kanevsky et al. | ......... 379/88.02 |
| 6,609,198 | B1 | * | 8/2003 | Wood et al. | ................... 713/155 |
| 6,892,307 | B1 | * | 5/2005 | Wood et al. | ....................... 726/8 |

(Continued)

FOREIGN PATENT DOCUMENTS

WO    WO2007041351    4/2007

OTHER PUBLICATIONS

"Trusted Computing-Based Security Architecture for 4G Mobile Networks"—Zheng et al, MSR-Waypoint, Jun. 2005 http://msr-waypoint.com/en-us/people/yuzheng/trusted_computing-based_security_architecture_for_4g_mobile_netw.pdf.*

(Continued)

*Primary Examiner* — Randy Scott
(74) *Attorney, Agent, or Firm* — DeLizio Law, PLLC

(57) ABSTRACT

Some embodiments include a method for determining whether to establish a connection between a computer and a network. In some embodiments, the method includes: receiving first network information from a network; determining a first trust level for the network by matching the network information to provisioning information, wherein the provisioning information indicates the first trust level and an authentication method of the network; verifying that network supports the authentication method, wherein the verifying includes exchanging information with the network; after verifying that the network supports the authentication method, establishing a connection to the network, wherein the connection provides access to an Internet.

9 Claims, 12 Drawing Sheets

(56) References Cited

U.S. PATENT DOCUMENTS

| | | |
|---|---|---|
| 7,213,048 B1 | 5/2007 | Parupudi et al. |
| 7,296,288 B1 | 11/2007 | Hill et al. |
| 7,756,082 B1 | 7/2010 | Dhamdhere |
| 7,805,414 B2 * | 9/2010 | Duplessis et al. ............. 707/694 |
| 7,889,663 B1 | 2/2011 | Wright et al. |
| 2002/0029276 A1 * | 3/2002 | Bendinelli et al. ............ 709/227 |
| 2003/0212909 A1 | 11/2003 | Chandrashekhar et al. |
| 2005/0177631 A1 | 8/2005 | Bahl et al. |
| 2005/0207410 A1 | 9/2005 | Adhikari et al. |
| 2006/0094400 A1 | 5/2006 | Beachem et al. |
| 2006/0117104 A1 * | 6/2006 | Taniguchi et al. ............ 709/225 |
| 2006/0174035 A1 | 8/2006 | Tufail |
| 2006/0187873 A1 | 8/2006 | Friday et al. |
| 2008/0049702 A1 | 2/2008 | Meylan et al. |
| 2009/0028120 A1 | 1/2009 | Lee |
| 2013/0109313 A1 | 5/2013 | Kneckt et al. |
| 2013/0150012 A1 | 6/2013 | Chhabra et al. |
| 2014/0185469 A1 | 7/2014 | Marmolejo-Meillon et al. |

OTHER PUBLICATIONS

"U.S. Appl. No. 11/239,707 Office Action", Apr. 15, 2011, 11 pages.
"International Application Serial No. PCT/US06/38155", Written Opinion mailed Dec. 31, 2007, 4 pages.
"International Application Serial No. PCT/US06/38155", International Search Report mailed Dec. 31, 2007, 5 pages.
"U.S. Appl. No. 11/239,707 Final Office Action", Mar. 4, 2010, 23 pages.
"U.S. Appl. No. 11/239,707 Office Action", Apr. 2, 2009, 17 pages.
"U.S. Appl. No. 11/239,707 Office Action", Jan. 24, 2011, 9 Pages.
Karp, David A., "Windows XP Annoyances for Geeks", *O'Reilly Media, Inc. 2nd Edition* Nov. 16, 2004, Chapter 7, Section 7.5, 19 pages.
"U.S. Appl. No. 11/239,707 Office Action", Nov. 28, 2014, 14 pages.
"U.S. Appl. No. 13/732,226 Office Action", Nov. 25, 2014, 10 pages.

* cited by examiner

500

| NETWORK NAME | RANK | SECURITY LEVEL | NETWORK TYPE |
|---|---|---|---|
| T-MOBILE | 1 | TRUSTED | WI-FI |
| TAILSHEADS | 2 | TRUSTED | WI-FI |
| AIRNET | 3 | UNTRUSTED | WI-FI |

NETWORK CONNECTION AGENT

FIG. 5

ADVANCED NETWORK CHARACTERIZATION

RELATED APPLICATIONS

This application claims priority benefit to U.S. patent application Ser. No. 11/239,707, filed Sep. 29, 2005. This application is a continuation-in-part of the 11/239,707 patent application. This patent application incorporates by reference the U.S. patent application Ser. No. 11/239,707 (US Patent Publication 20070073868) in its entirety.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2011, iPass Inc.

FIELD

Embodiments of the inventive subject matter relate generally to the field of telecommunications, and more particularly to the field network connectivity.

BACKGROUND

In today's computing environment, there are many broadband networks, such as free networks, enterprise networks, public hotspots, hotel broadband networks, home networks, etc. These networks typically provide extensive connectivity and high data transfer rates. However, the availability of numerous networks can pose security risks and management difficulties. For example, attackers can set-up rogue network access points that appear to provide access to legitimate networks. In the course of providing access to illegitimate networks, the attackers may have an opportunity to steal data, delete data, spread viruses, etc.

Because of the multitude of available networks, users often resort to using multiple connection clients for connecting with multiple networks. As a result, connecting to different networks is rarely seamless and often requires user intervention. Having numerous connection clients can consume considerable system resources and often causes user confusion and frustration. As a result, there is a need for a system for securely and easily connecting to networks.

BRIEF DESCRIPTION OF THE FIGURES

The present invention is illustrated by way of example and not limitation in the Figures of the accompanying drawings in which:

FIG. 5 is a block diagram illustrating a graphical user interface, according to some embodiments of the invention.

DESCRIPTION OF THE EMBODIMENTS

This document describes techniques for classifying and characterizing networks before connecting to the networks. This description of the embodiments is divided into four sections. The first section provides an introduction to some embodiments of the inventive subject matter, while the second section describes components included in some embodiments. The third section describes operations performed by some embodiments. The fourth section provides some general comments.

Introduction

Many computing devices (e.g., laptop computers, personal digital assistants, mobile media devices, etc.) connect to networks to access data, software, and services. These computing devices often include network connection agents that detect available networks, facilitate network selection, and connect to selected networks. During operation, connection agents may detect numerous networks available for connection. Some of the available networks may pose unacceptable security risks. For example, certain networks may be known for having poor security (e.g., allowing anyone to access the networks without authentication). In other instances, attackers may be operating imposter networks that appear to be known, safe networks. In reality, the imposter networks lure users to connect, so attackers can steal data, steal authentication information, destroy data, spread viruses, or perform other harmful operations.

Some embodiments of the inventive subject matter enable computing devices to make informed decisions about whether to connect to available networks. In some instances, connection agents glean information about networks by probing the networks, but without connecting to the networks. For example, connection agents may perform operations to determine what authentication protocol is used by a network. Using the information gleaned from probing, the connection agents can avoid connecting to potentially harmful networks. For example, if a network's authentication protocol differs from an expected protocol, the connection agent can assume the network is unsafe, and thus avoid connecting to that network.

Although probing has many benefits, some networks may interpret certain probing operations as potentially harmful. These networks may respond by taking remedial action, such as by locking-out devices performing suspicious probing. Because some probing can cause lock-outs and other undesired effects, embodiments of the connection agent can select probing operations that will not appear suspicious to networks (i.e., will not cause lock-outs or other conditions that limit or preclude connectivity). As a result, embodiments of the inventive subject matter reduce risks associated with network connectivity, while also avoiding problems associated with network probing. The following discussion of FIG. 1 provides more detail about some embodiments.

Figure 1:
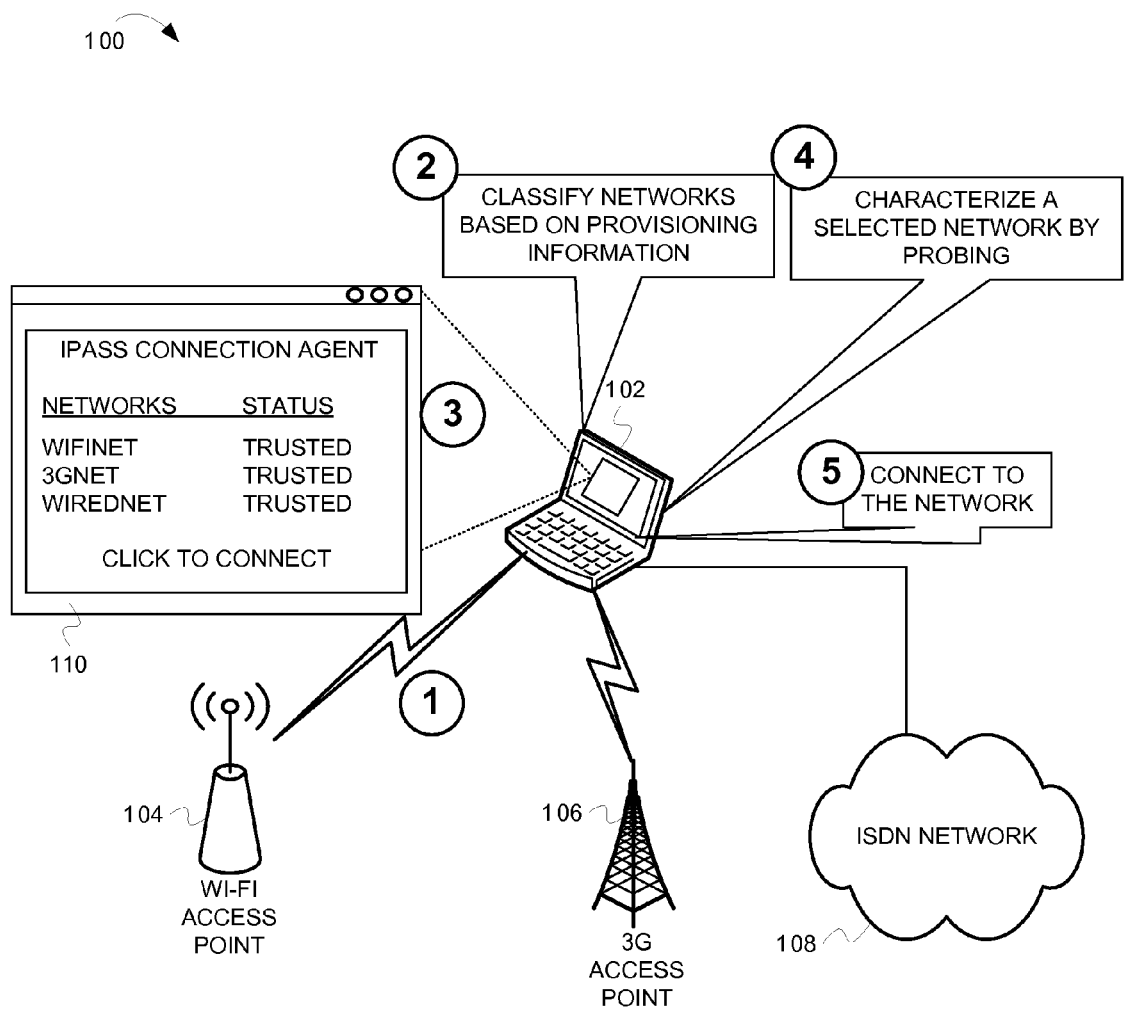
FIG. 1 is a conceptual diagram illustrating operations of a connection agent, according to some embodiments of the invention.

FIG. 1 is a conceptual diagram illustrating operations of a connection agent, according to some embodiments of the invention. In FIG. 1, a laptop computer 102 includes a connection agent (not shown) capable of detecting networks that are available for connection. In FIG. 1, the following networks are available: a Wi-Fi network, 3G network, and ISDN network. The laptop's connection agent can connect to these networks via a Wi-Fi access point 104, a 3G access point 106, and an ISDN network 108.

In FIG. 1, the operations occur in five stages. At stage 1, the laptop's connection agent detects the Wi-Fi, 3G, and ISDN networks by interacting with the access points 104, 106, & 108. In some embodiments, the connection agent can detect any type of network, such as Ethernet networks, 4G networks, Sonet networks, etc.

At stage 2, the connection agent classifies the networks based on provisioning information, and information in a venue cache. Provisioning information can include information that is known about the networks. For example, for a given Wi-Fi network, the provisioning information may indicate the Wi-Fi network's service set identifier (SSID), basic service set identifiers (BSSIDs) for Wi-Fi access points included in the Wi-Fi network, authentication credentials, expected authentication protocols, etc. The connection agent can classify networks by comparing information gleaned from the networks (e.g., SSID and BSSID) with provisioning information. In some instances, as a result of classification, the connection agent determines whether a network is known (e.g., identified in the provisioning), and whether the network is trusted. For example, the connection agent may detect the Wi-Fi network's SSID and BSSID, as the Wi-Fi access point 104 may periodically broadcast beacons including its SSID and BSSID. In turn, the connection agent can compare the SSID and BSSID with expected values in the provisioning information. If the SSID and BSSID match the provisioning information, the connection agent can classify the network as known and trusted. The connection agent's venue cache includes results from earlier classifications and characterizations. Thus, the connection agent can utilize information in the venue cache to speed-up classification and characterization. For example, if venue cache information indicates that the network's SSID and BSSID are associated with a known and trusted network, the connection agent may immediately connect to the network, skipping stages 3 & 4. Although these examples refer to SSIDs and BSSIDs, embodiments can perform classification using any suitable network information, as discussed in more detail below.

At stage 3, the connection agent presents a list of networks it has detected. As shown, the connection agent can present the network list in a graphical user interface 110 appearing on the laptop computer 102. Based on the classification (stage 2), the graphical user interface 110 indicates that the Wi-Fi network, 3G network, and ISDN network are trusted networks. In some instances, a user can select any of the networks for connection. In other instances, fewer than all networks are selectable for connection (e.g., untrusted networks may not be selectable for connection). Also during stage 3, the connection agent receives a network selection via the graphical user interface 110.

During stage 4, the connection agent characterizes the selected network by probing the network. As mentioned above, the connection agent can probe the network for information without creating a network connection. For example, the connection agent can probe the Wi-Fi network to determine its authentication protocol. If the network's SSID, BSSID, and authentication protocol match those stored in the provisioning information, the connection agent characterizes the network as known and trusted. During stage 5, the connection agent connects to the Wi-Fi network.

Because the connection agent can probe the network for information, and compare that information with provisioning information, the connection agent can reduce the risk of connecting to potentially harmful networks. The following discussion will provide more details about various embodiments of the inventive subject matter.

Components and Operating Environment

This section describes an example operating environment and presents structural aspects of some embodiments. For example, this section includes discussion about connection agents, computing devices, and networks.

Figure 2:
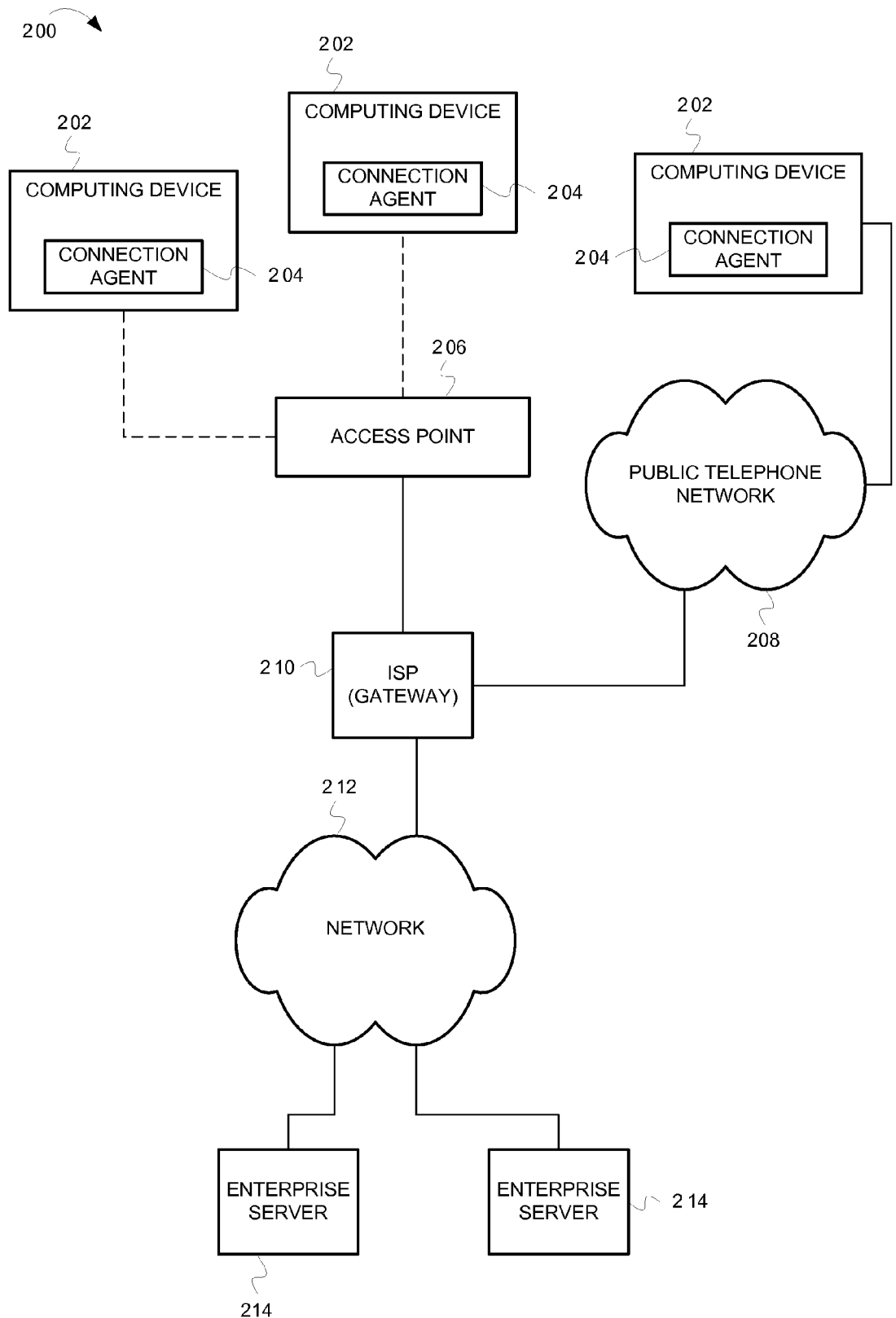
FIG. 2 is a block diagram illustrating a system in which connection agents connect computing devices to networks, according to some embodiments of the invention.

FIG. 2 is a block diagram illustrating a system in which connection agents connect computing devices to networks, according to some embodiments of the invention. In FIG. 2, a system 200 includes computing devices 202, which include connection agents 204. The system 200 also includes an access point 206, public telephone network 208, Internet service provider (ISP) 210, network 212, and enterprise servers 214.

During operation, the connection agents 204 can connect the computing devices 202 to the ISP 210, which in turn, connects the computing devices to the enterprise servers 214. The ISP 210 can also enable the computing devices 202 to communicate with devices on the Internet (not shown).

In some embodiments, the computing devices 202 include desktop computers, notebook computers, tablet computers, personal digital assistants, mobile telephones, mobile media devices, etc. In other embodiments, one or more of the computing devices 202 can be embedded in other systems, such as automobiles, air craft, etc. The following discussion of FIG. 3 provides more details about connection agents.

Figure 3:
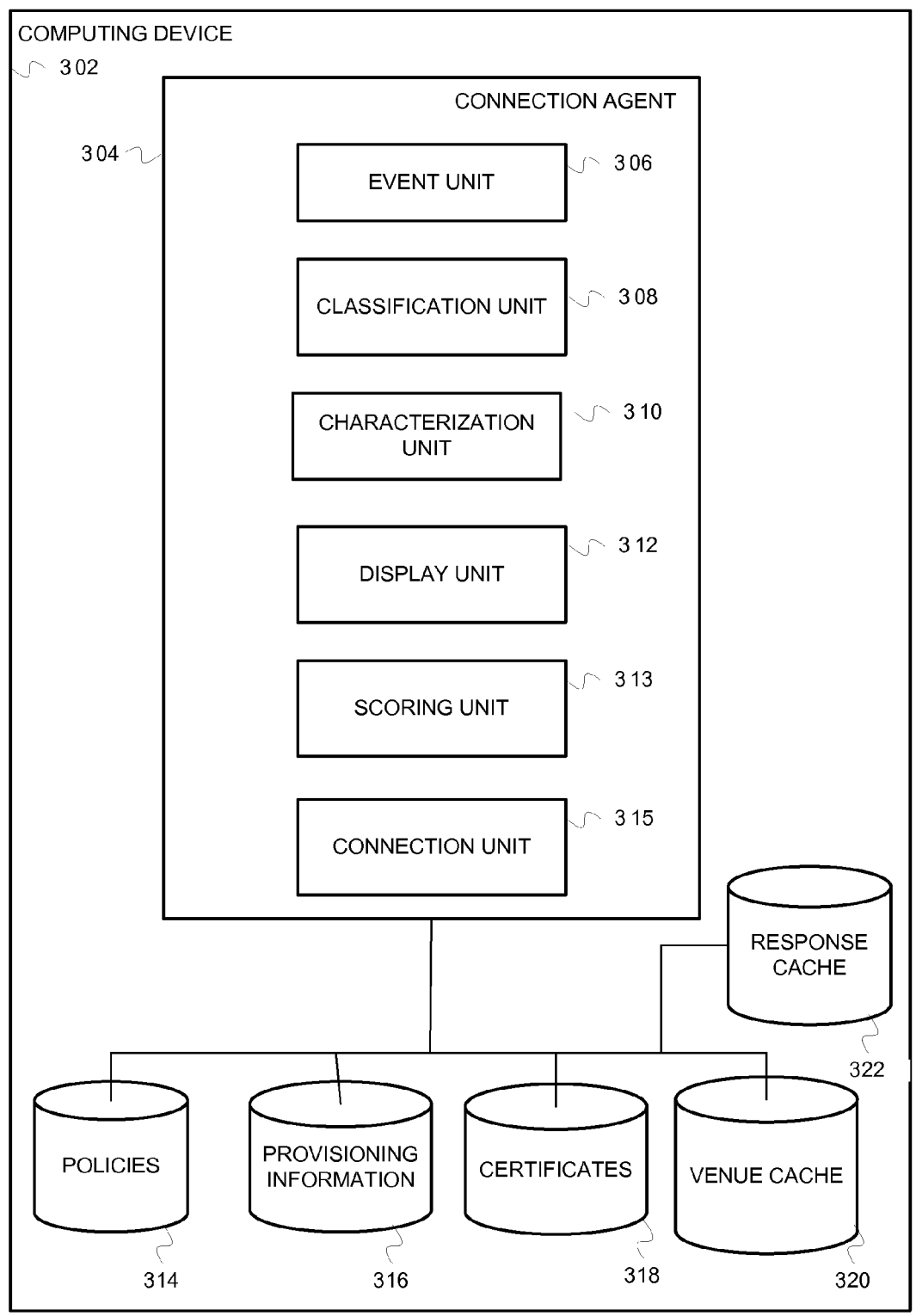
FIG. 3 is a block diagram illustrating components of a connection agent, according to example embodiments of the invention.

FIG. 3 is a block diagram illustrating components of a connection agent, according to example embodiments of the invention. In FIG. 3, the connection agent 304 includes an event unit 306, classification unit 308, characterization unit 310, connection unit 315, scoring unit 313, and display unit 312. The connection agent 304 has access to policies 314, provisioning information 316, certificates 318, a venue cache 320, and a response cache 322.

The event unit 306 can detect network events that indicate the presence of available networks. The classification unit 304 can classify networks into categories (e.g., known and unknown) and classes (e.g. trusted, untrusted, semi-trusted, etc.). The classification unit 308 makes determinations about network trust levels based on the provisioning information 316 and information received from networks. The characterization unit 310 can probe networks to make further determinations about network trust levels. The display unit 312 can perform operations for interacting with users, such as determining which of the available networks to display to users, processing user input, etc. The scoring unit 313 can determine a score for networks, where the scores are based on factors such as connection history, signal strength, network media type, etc. The connection unit 315 can connect the computing device 302 to networks.

In some instances, an enterprise provides the connection agent 304 to its employees to facilitate secure network connectivity across a wide geographic area. For example, the connection agent 304 can facilitate secure connectivity when employees connect at an enterprise campus, when employees are travel off campus, when employees are at their homes, etc. The enterprise's information technology administrators may configure the policies 314 so the connection agent 304 operates at a risk level acceptable to the enterprise. Administrators and trusted parties outside the enterprise may provide the provisioning information 318. The connection agent 304 uses the provisioning information 318 to determine whether networks are trusted (e.g., by comparing information received from networks to the provisioning information 318). The provisioning information 318 includes information about known networks. For example, for a particular network, the provisioning information may indicate the network's identification information, authentication protocols, authentication credentials (e.g., passwords, certificates, etc.), access point locations (for wireless networks), dial-up telephone numbers (for dial-up networks), and other information useful for connecting to the network. The following lists show provisioning information for networks of different media types.

Wi-Fi Network—SSID, BSSID, capability flags, network mask, Gateway IP address, access method, trust level, category, etc.

Ethernet Network—access method, network mask, gateway IP address, trust level, category, etc.

3G Network—trust level, category, carrier identifier, network identifier, network mask, access method, network type, mode (auto, manual), network attachment information (CID, network credentials), etc.

4G Network—trust level, category, SSID, carrier identifier, network identifier

Dial-up Network—trust level, category, geographic context information, GeoContext including latitude and longitude plus geopolitical context (zip code, country, city, country, continent, etc.), etc.

The provisioning information can include records for multiple networks of the same media type. In some embodiments, the provisioning information 316 is organized into network directories (a.k.a. phonebooks). For example, the provisioning information 316 may include three network directories:

Personal Directory—Entries in the personal directory include information about a user's personal-use networks that are not controlled by an enterprise. The user may trust networks in the personal directory.

Campus Directory—Entries in the campus directory include information about networks controlled by an enterprise. Networks in the campus directory are trusted.

Public Directory—Entries in the public directory include information about public networks that may be trusted.

In some instances, all networks in a particular directory may have the same trust level. For example, all networks in the campus directory may have the highest trust level (e.g., because networks in the campus directory are controlled by the enterprise). In some embodiments, for each network represented in a network directory, there is a list of provisioning information. For example, a Wi-Fi network in the campus directory may have the following provisioning information: SSID, category, trust level, etc. The network directory in which a network is listed can affect how a network is scored and ranked (described below).

The classification unit 308 can use the venue cache 320 to save time. The venue cache 320 stores authoritative network information collected during prior network connections. For example, the venue cache 320 may associate a Wi-Fi network's MAC/BSSID combination with a trust level, based on a prior connection. If the classification unit 308 encounters a network with a matching MAC/BSSID combination, it can resolve the MAC/BBSID combination to an initial trust level stored in the venue cache 320. If the classification unit 308 uses the venue cache 320 to classify a network, it can mark a flag to indicate cache values were used to classify the network. If the network is later characterized using information obtained by probing the network, the connection agent 304 updates the network's trust level, category (e.g., known or unknown), score (described below), ranking (described below), and other information. Updating may change the trust level, which may cause the connection agent to make the network inaccessible (e.g., if the updated trust level became untrusted). In some embodiments, entries in the venue cache 320 may become invalid when a network is out of range for a given number of network scan cycles, when a link down event occurs, and when a network adapter is powered off.

The characterization unit 310 can use the result cache 322 to save time, such as by avoiding certain network probes. In some instances, network characterization entails an iterative process that repeats certain network probe operations. The characterization unit 310 can store results of a network probe operation in the result cache 322, and later use those cached results instead of repeating the probe operations. Entries in the result cache 322 may become invalid for the following reasons: a corresponding network adapter is powered off or otherwise disabled, a network goes out of range or link down event occurs, an entry's time to live expires, and the characterization unit 310 forces a re-probe of the network.

Although not shown in FIGS. 1-3, the computing devices can include any suitable processors, memory devices, storage devices, display devices, application-specific integrated circuits, and other components for carrying out operations described herein.

The inventive subject matter can be embodied as systems, methods, or computer program products. Accordingly, aspects of the present inventive subject matter may take the form of entirely hardware embodiments, entirely software embodiments (e.g., including firmware, resident software, micro-code, etc.), or embodiments combining software and hardware. Furthermore, aspects of the inventive subject matter may take the form of a computer program product embodied in one or more computer readable medium(s) having computer readable program code embodied thereon.

Any combination of one or more computer readable mediums may be utilized. The computer readable medium may be a computer readable signal medium or a computer readable storage medium. A computer readable storage medium may be, for example, an electronic, magnetic, optical, electromagnetic, infrared, or semiconductor system, apparatus, or device, or any suitable combination of the foregoing. More specific examples (a non-exhaustive list) of the computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), and an optical storage device, a magnetic storage device. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Operations

This section describes operations performed by some embodiments of the invention. In the discussion below, the flow diagrams will be described with reference to the block diagrams presented above. In certain embodiments, the operations are performed by executing instructions residing on computer-readable media (e.g., software), while in other embodiments, the operations are performed by hardware and/or other components (e.g., firmware). In some embodiments, the operations are performed in series, while in other embodiments, one or more of the operations can be performed in parallel. Moreover, some embodiments perform less than all the operations shown in the flow diagrams.

Figure 4:
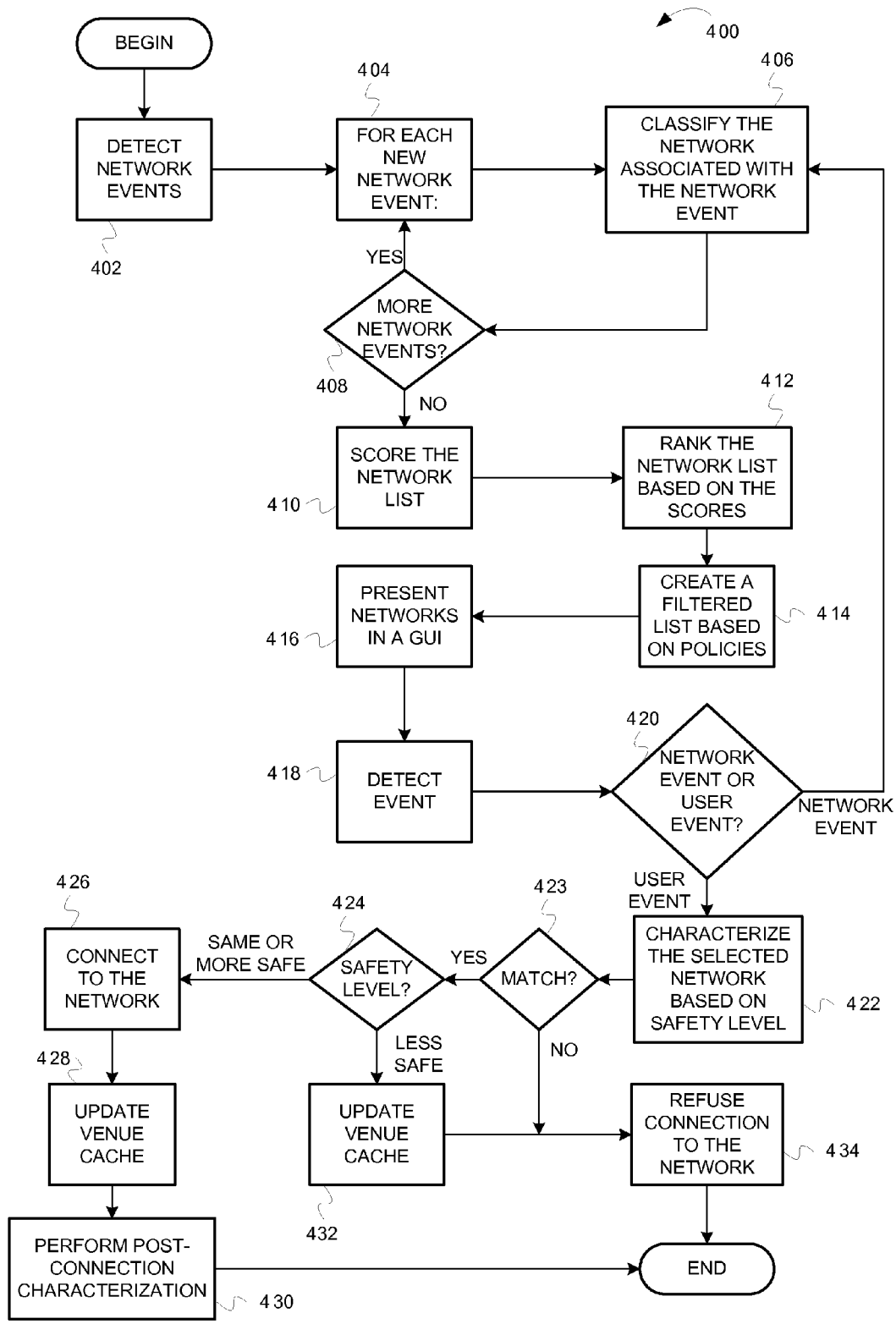
FIG. 4 is a flow diagram illustrating operations for detecting, classifying, characterizing, and connecting to networks, according to some embodiments.
Figure 6:
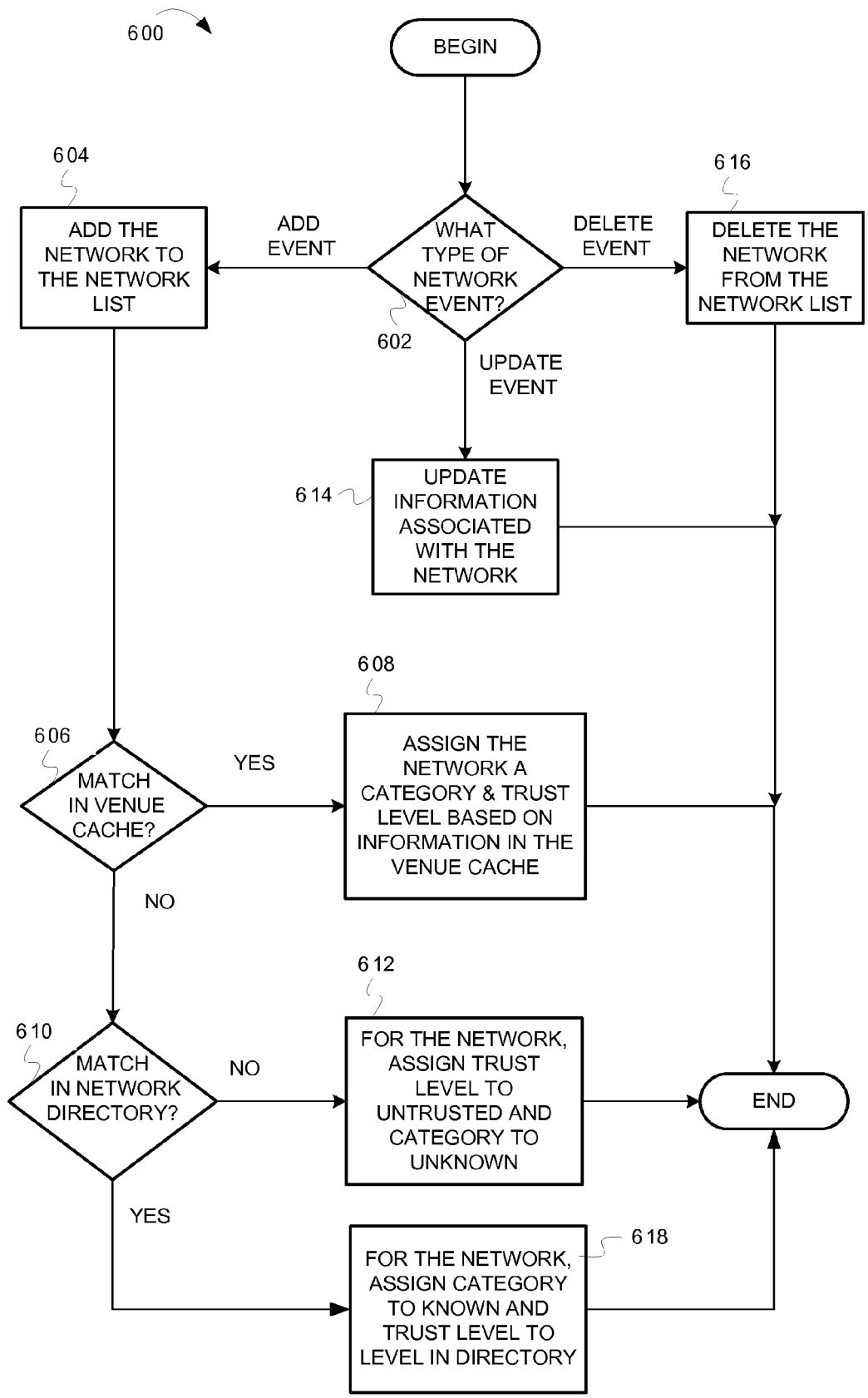
FIG. 6 is a flow diagram illustrating operations for classifying networks, according to some embodiments of the invention.

The following discussion of FIGS. 4-6 describes operations for detecting, classifying, characterizing, and connecting to networks.

FIG. 4 is a flow diagram illustrating operations for detecting, classifying, characterizing, and connecting to networks, according to some embodiments. In some embodiments, a connection agent performs the operations shown in the flow 400, which begins at block 402.

At block 402, a connection agent's event unit 306 detects network events. In some embodiments, the event unit 306 registers to receive events from an operating system residing on the computing device 302. In some embodiments, after the connection agent 304 launches into operation, it goes inactive until the operating system reports an event. The operating system can detect the events at network adapters and other peripheral devices, and report the events to the event unit 306. The network events can indicate that networks are available, unavailable, or that network information has changed. The events can include Ethernet link-up events, detection of Wi-Fi beacons, changes to Wi-Fi signal strength, user input at peripheral devices, etc. The flow continues at block 404.

At block 404, the connection agent 204 iteratively processes each of the network events by performing operations shown at blocks 404, 406, and 408. At block 406, the connection agent's classification unit 308 classifies a network associated with the latest network event. The classification unit 308 can use information that was received from the network without probing the network. The type of information received from the network depends on the media type of the network detected. For example, for Wi-Fi networks, the connection agent may detect Wi-Fi beacons including SSIDs, BSSIDs, and other information. For 3G networks, the agent may detect a 3G network identifier. For dial-up networks, the connection agent may detect a signal (e.g., dial tone) or other information. Thus, after receiving information from/about the network, the connection agent knows the network's media type and other information (e.g., Wi-Fi SSID, 3G network identifier, etc.).

After receiving information from/about the network, the connection agent's classification unit 308 compares the network information against information in the provisioning information 316. For example, the classification unit 308 compares the network information (e.g., {SSID, media type—Wi-Fi}) with the provisioning information, such as entries in the public, campus, and personal directories. If there is a match, the connection agent may make a preliminary determination that the network is known, and that the network has whatever trust level is indicated in the provisioning information (e.g., trust level=trusted). In some instances, instead of comparing against provisioning information, the classification unit 308 matches the network information with information in the venue cache 320.

At block 406, in addition to classifying networks, the classification unit 308 creates/maintains a network list including all available networks (i.e., networks detected at block 402). The network list is used later in the flow 400. The operation at block 406 is described in greater detail in FIG. 6, which shows how some embodiments classify networks. FIG. 6 will be discussed in detail below. The flow continues at block 408.

At block 408, the connection agent 304 determines whether there are more network events for processing (i.e., events received at block 402). If there are more network events, the flow continues at block 404. Otherwise, the flow continues at block 410.

At block 410, the connection agent scores each network in the network list. As noted in the discussion of network classification (block 406), the classification unit 308 creates a network list including the networks it has classifies. The connection agent's scoring unit 313 can determine a score for each network in the network list. In some embodiments, one or more of the following factors contribute to a network's score:

Network Media Type—The media type can be Wi-Fi, Ethernet, 3G, 4G, Dial-up, etc.

Signal Strength—The signal strength typically refers to signal strength of wireless networks. However, signal strength may be relevant to some wired networks. The signal strength of a network may change. As a result, a network's score may change as signal strength increases and decreases.

Connection History—Connection history may include information (e.g., records, statistics, etc.) about successful and failed attempts to connect to the network. The connection history may change, so the network's score may change as connection history changes.

Provisioner Type—The provisioner type refers to the network directory in which the network is listed. Network directories can include a Public Directory, a Personal Directory, and a Campus directory.

In some embodiments, each of the above-noted factors can be weighted, and then combined to constitute a network score for each network in the network list. Weights can be preset or adjustable. Some of the factors are included in the provisioning information 316 (e.g., provisioner type), whereas other factors are determined based on information received from the network (e.g., signal strength). Thus, at block 410, the connection agent's scoring unit 313 determines a network score for each network in the network list. The flow continues at block 412.

At block 412, the connection agent's score unit 313 ranks the network list based on the scores. For example, the network receiving the highest score may be the top-ranked network.

The network rankings may descend along with network scores, where the second highest score has the second-highest rank, the third highest score has the third highest rank, and so on. In some instances, higher ranked networks are more trusted, have better signal strength, have fewer transmission errors, etc. Embodiments can employ any suitable ranking system. The flow continues at block 414.

At block 414, the connection agent's display unit 312 creates a filtered network list. For example, the filtered list can include only networks that were classified as known and trusted. In some embodiments, the display unit 312 does not filter the network list. The flow continues at block 416.

At block 416, the connection agent's display unit 312 presents the network list in a graphical user interface. FIG. 5 is a block diagram illustrating a graphical user interface, according to some embodiments of the invention. As shown in FIG. 5, the graphical user interface 500 presents the ranked network list. Additionally, the graphical user interface 500 indicates whether the networks are trusted, and a network media type (e.g., Wi-Fi). In some embodiments, users can select one of the networks in the graphical user interface 500. Referring back to FIG. 4, the flow continues at block 418.

At block 418, the connection agent 304 detects an event. The flow continues at block 420.

At block 420, the network agent determines whether the event is a network event or a user event. If the event is a network event, the flow continues at block 406. If the flow continues at block 406, the flow will not loop through blocks 404, 406, 408 because there is only one network event to process at block 408—the event detected at block 418. Thus, after classifying the network associated with the network event (block 406), the flow will continue through block 408 to block 410. At block 410, the connection agent scores the network list and proceeds through the flow 400.

If the event is a user event, at block 420, the flow continues at block 422. The user event represents user input selecting a network for connection from the graphical user interface 500. Although a user may want to connect to a selected network, the connection agent 308 will not complete the connection unless it can verify more information about the network. That is, the agent 308 will not connect until it has more information corroborating trustworthiness of the network.

At block 422, the connection agent's characterization unit 310 characterizes the selected network. The connection agent's characterization unit 310 characterizes the selected network by probing the network for information without establishing a network connection. For example, for Wi-Fi networks, the characterization unit 310 may determine that a Wi-Fi network's authentication protocol is 802.1x. The characterization unit 300 can probe the Wi-Fi network by sending an identification request to the network's 8021.X server, and receiving a response from the 8021.X server. If the 8021.X server's response matches provisioning information, the characterization unit 310 may characterize the network as known and trusted. By performing the operation at block 422 (i.e. characterization), the connection agent 304 can make better decisions about whether a given network poses risks (e.g., viruses, data theft, etc.) without actually connecting to the network.

As noted above, some embodiments work for any suitable network media types, such as Ethernet networks, Wi-Fi networks, dial-up networks, etc. In some embodiments, the connection agent performs different operations for characterizing networks depending on network type. For example, operations for characterizing Wi-Fi networks may differ from operations for characterizing Ethernet networks. The discussion of FIGS. 7-12 describes operations for characterizing different network types. The flow continues at block 423.

At block 423, the connection agent determines whether the characterization produced a match in provisioning information. If there is no match, the flow continues at block 434. Otherwise, the flow continues at block 424.

At block 424, the connection agent's connection unit 315 determines whether the selected network appears safer as a result of characterization. That is, the connection unit 315 compares results of classification with results of characterization. For example, classification operation (at block 406) may indicate that a network is known but untrusted. After the connection agent 304 performs characterization (at block 422), the perceived trust level may increase (changing from trusted to untrusted), decrease (changing from trusted to untrusted), or remain the same. If the trust level is the same or increases, the flow continues at block 426. If the trust level decreases, the flow continues at block 432.

At block 426, the connection agent's connection unit 315 connects to the network. By connecting, the computing device 302 can communicate with other devices on the network, such as enterprise servers 204, web servers, e-mail servers, etc. The flow continues at block 428.

At block 428, the characterization unit 310 updates the venue cache 320 to include information learned from the characterization operation (at block 422). Such information may indicate that the network to which the connection agent is connected is known and trusted. The flow continues at block 430.

At block 430, the characterization unit 310 performs post-connection characterization. After connecting to the network, the characterization unit 310 can learn more about whether the network is authentic. For example, the characterization unit 310 can query the provisioning information 316 to determine a list of devices (e.g., printers, storage devices, fax devices, etc.) that should be available on the network. If devices enumerated in the provisioning information 316 are available, the characterization unit 310 has more evidence supporting its determination that the network should be trusted. However, if none of the devices are available, the characterization unit 300 and may perform additional tests, or it may downgrade the trust level. Additional post-connection tests can determine whether devices, services, protocols, etc. listed in the provisioning information 316 are actually available on the network. From block 430, the flow ends.

As noted above, at block 424, if the network's trust level is less than expected, the flow continues at block 432. At block 432, the characterization unit 310 updates the venue cache 320 to include information learned from the characterization operation (at block 422). Such information may indicate that the network is known and untrusted. The flow continues at block 434.

At block 434, the connection agent's connection unit 315 refuses connection to the network. In some instances, the connection agent 304 refuses to connect to a network because the network's trust level is untrusted, or otherwise has a lower trust level than needed for establishing a connection. From block 434, the flow ends.

As mentioned above, embodiments of the connection agent perform operations for classifying networks. For example, in FIG. 4, a connection agent classifies a network at block 406. The following discussion of FIG. 6 provides details about how some embodiments may perform network classification.

FIG. 6 is a flow diagram illustrating operations for classifying networks, according to some embodiments of the invention. Some embodiments may perform the operations of FIG. 6 when performing the classification at FIG. 4's block 406.

Just before FIG. 4's block 406, the connection agent detects one or more network events. The flow 600 describes how some embodiments characterize networks by processing those network events. At block 602, the connection agent's classification unit 308 determines what type of network event was detected. In some embodiments, the network event can be one of three types: an add event, delete event, or update event. An add event indicates that a network is available and should be added to a list of available networks (i.e., the network list). A delete event indicates that a network is no longer available, so the network should be deleted from the network list. An update event indicates some information about the network has changed. If the event is an add event, the flow continues at block 604. If the event is an update event, the flow continues at block 614. If the event is a delete event, the flow continues at block 616.

For an add event, at block 604, the classification unit 308 adds the network to a list of available networks (i.e., the network list). The flow continues at block 606.

The add event indicates information about a network (i.e., the network from which the add event originated). For example, for a Wi-Fi network, the event can include information in a Wi-Fi beacon, such as SSID, BSSID, etc. For a 3G network, the event may include the 3G network's identifier. The event can include other information for networks of other media types. At block 606, the classification unit 308 compares this information with information in the venue cache 320. If there is a match in the venue cache, the flow continues at block 608. At block 608, the classification unit 308 determines whether the network is known and trusted based on information in the venue cache 320. Based on previous classifications and/or characterizations, the venue cache 320 indicates a network category (e.g., known or unknown) and network trust level (e.g., trusted, untrusted, semi-trusted). From block 608, the flow ends.

If there is not a match in the venue cache, the flow continues at block 610. At block 610, the classification unit 308 determines whether information about the network matches provisioning information, such as information in one of the network directories (a.k.a. phone books). If the information does not match provisioning information, the flow continues at block 612, where the classification unit 308 assigns the network category to be unknown, and the network trust level to be un-trusted. From block 612, the flow ends.

At block 610, if the information matches provisioning information, the flow continues at block 618. At block 618, the classification unit 308 assigns the network's category to be known, and the network's trust level to be a trust level indicated in the provisioning information (e.g., trusted). From block 618, the flow ends.

Referring back to block 602, if the event is an update event, the flow continues at block 614. At block 614, the classification unit 308 updates information associated with the network. For example, the event may indicate a change in signal strength. The classification unit 308 records the signal strength change because such a change may affect scores and ranking.

At block 602, if the network event is a delete event, the flow continues at block 616. At block 616, the classification unit 308 deletes the network from the network list. As a result, the network is no longer available for connection. From block 616, the flow ends.

More Characterization Techniques

As noted above, network characterization is a process by which a connection agent compares information received from a network to provisioning information that describes a network. The following flow diagrams show how embodiments of the invention can employ different techniques of characterization for different network media. For example, FIG. 7 describes operations for characterizing Wi-Fi networks, whereas FIG. 9 describes operations for classifying Ethernet networks. Additionally, FIGS. 8 & 10-12 include operations for characterizing other network media types. In some embodiments, when performing characterization at block 422 of FIG. 4, the connection agent performs one or more of the following flow diagrams. The discussion continues with a description of characterizing Wi-Fi networks.

Figure 7:
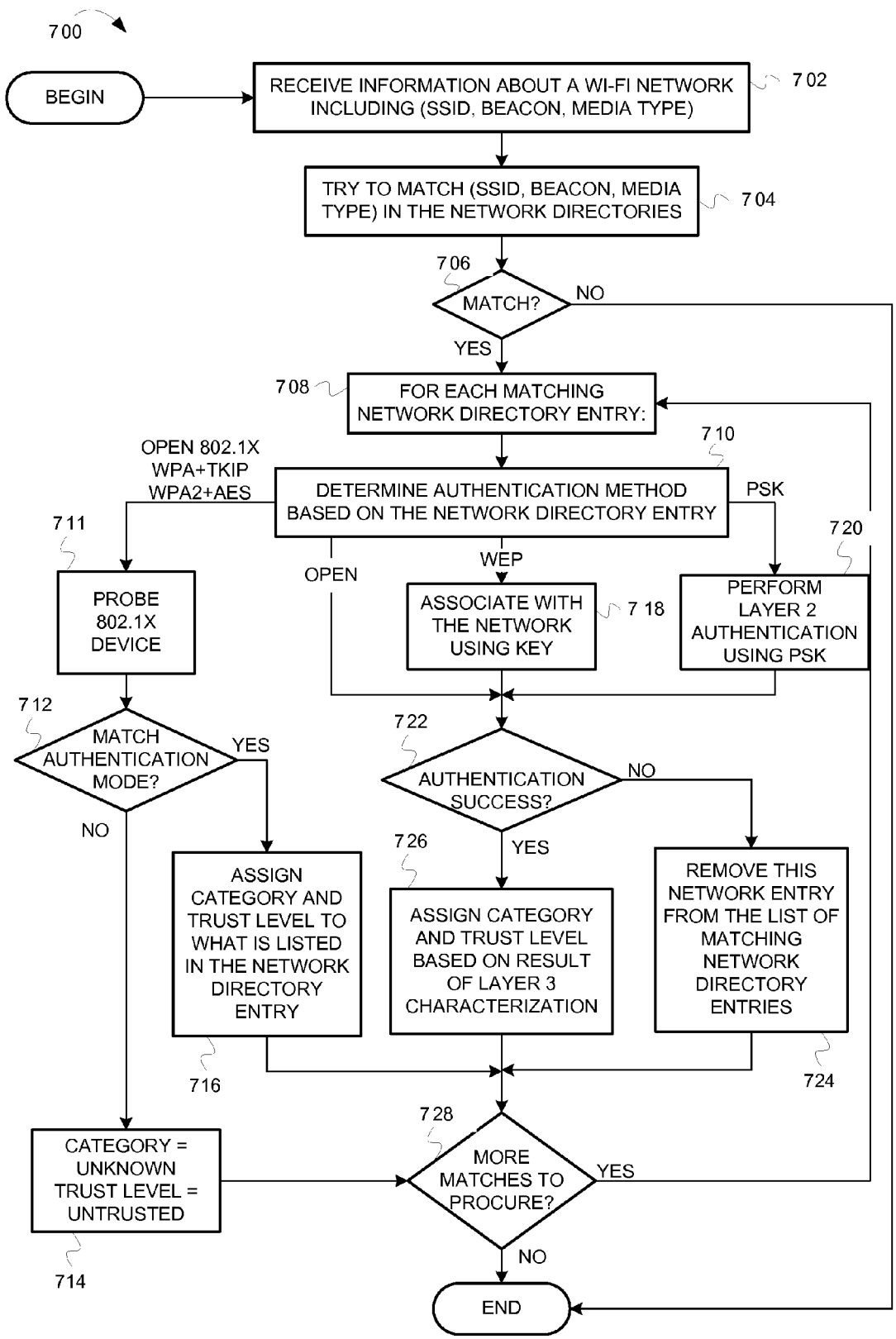
FIG. 7 is a flow diagram illustrating operations for characterizing Wi-Fi networks, according to some embodiments of the invention.

FIG. 7 is a flow diagram illustrating operations for characterizing Wi-Fi networks, according to some embodiments of the invention. In FIG. 7, the flow 700 begins at block 702, where a connection agent receives information about a Wi-Fi network. In some embodiments, the information is included in a network event, which is detected at FIG. 4's block 402. The information can originate from a Wi-Fi access point, and include an SSID, Wi-Fi beacon, media type indicator, etc. The connection agent uses this information to classify the network, as described below. The flow continues at block 704.

At block 704, the connection agent tries to match the network information received at 702 with provisioning information, such as the network directories. For example, the connection agent tries to match the network information (e.g., SSID, beacon, and media type) to entries in its public directory, private director, and campus directory. The flow continues at block 706.

At block 706, the connection agent determines whether the network information matches provisioning information. For example, the information (received at block 702) may match entries in the public directory, campus directory, and personal directory. In some instances, the network information matches entries in more than one directory. The connection agent creates a list including all the matching directory entries. If there is a match, the flow continues at block 708, where the connection agent processes entries in the list. Otherwise, the flow ends.

At block 708, the flow begins a loop that processes each matching entry in the list. For example, a first pass through the loop will process a list entry that matched in the public directory, whereas a second pass through the loop will process a match in the campus directory, and so on for all list entries. The flow continues at block 710.

At block 710, the connection agent determines an authentication method based on the matching provisioning information. For example, each entry in the list of matching directory entries indicates an authentication method employed by a network. The connection agent will probe the network to verify the authentication method. The connection agent probes in different ways depending on the authentication method. If the entry indicates that the network uses 8021.X, Wi-Fi Protected Access (WPA)+Temporal Key Integrity Protocol (TKIP), or WPA2+Advanced Encryption Standard (AES), the flow continues at block 711. If the entry indicates that the network uses Wired Equivalent Privacy (WEP), the flow continues at block 718. If the entry indicates that the network uses a pre-shared key (PSK) protocol, the flow continues at block 720. If the entry indicates that the network is open (i.e., the network uses no authentication protocol), the flow continues at block 722.

At block 711, the connection agent probes the network's 8021.X device. For example, the connection agent sends an ID request to the 8021.X server and receives a response. The connection agent can store the response in a response cache (e.g., response cache 322). The connection agent can reuse this information in future iterations of the loop. For example, when processing another entry in the list, if entry's authentication protocol is 8021.X, the connection agent can skip block 711 by using results from the result cache.

At block 712, the connection agent determines whether information included in the 8021.X server's response matches authentication information in the matching directory entry. If there is a match, the connection agent updates the list entry's network category to be known and its trust level to "trusted." (See block 714.) If there is no match, the connection agent updates the list entry's network category to be unknown and its trust level to untrusted. (See block 716.) In the flow 700, the blocks 714 and 716 continue at block 728.

Referring back to block 710, if the authentication method is WEP, the flow continues at block 718. At block 718, the connection agent associates with the network using a WEP key included in the provisioning information (e.g., the matching directory entry). The connection agent can store information about associating with the network in the result cache. The flow continues at block 722.

Referring back to block 710, if the authentication method is a PSK protocol, the flow continues at block 720. At block 720, the connection agent attempts to associate with the Wi-Fi network using a pre-shared key indicated in the provisioning information (e.g., the matching network directory entry). The connection agent can store information about associating with the network in the result cache. The flow continues at block 722.

At block 722, if the association attempt is successful (e.g., the Wi-Fi access point accepted the WEP key), the connection agent moves to block 726, where it performs more characterization at the network layer (i.e., layer 3) of the OSI stack. For more information about performing more characterization of the network layer, see the discussion of FIG. 8 below. If the authentication is not successful, the connection agent moves to block 724, where it removes the network entry from the list of matching network entries. The flow continues at block 728, where the connection agent determines whether there are more matching network entries to process. If so, the flow 700 loops back to 708. Otherwise, the flow ends.

As noted above, the network information received at block 702 may match multiple entries in the network directories. Thus, the connection agent creates a list of matching entries, and then processes the list. After the flow 700, the list may include more than one entry. Thus, the connection agent may select and return one entry from the list, where the selected entry indicates a category and trust level for the network. The selection process can consider security policies and other factors. In some embodiments, the connection agent selects the list entry indicating the highest trust level (e.g., a network that is known and trusted).

Figure 8:
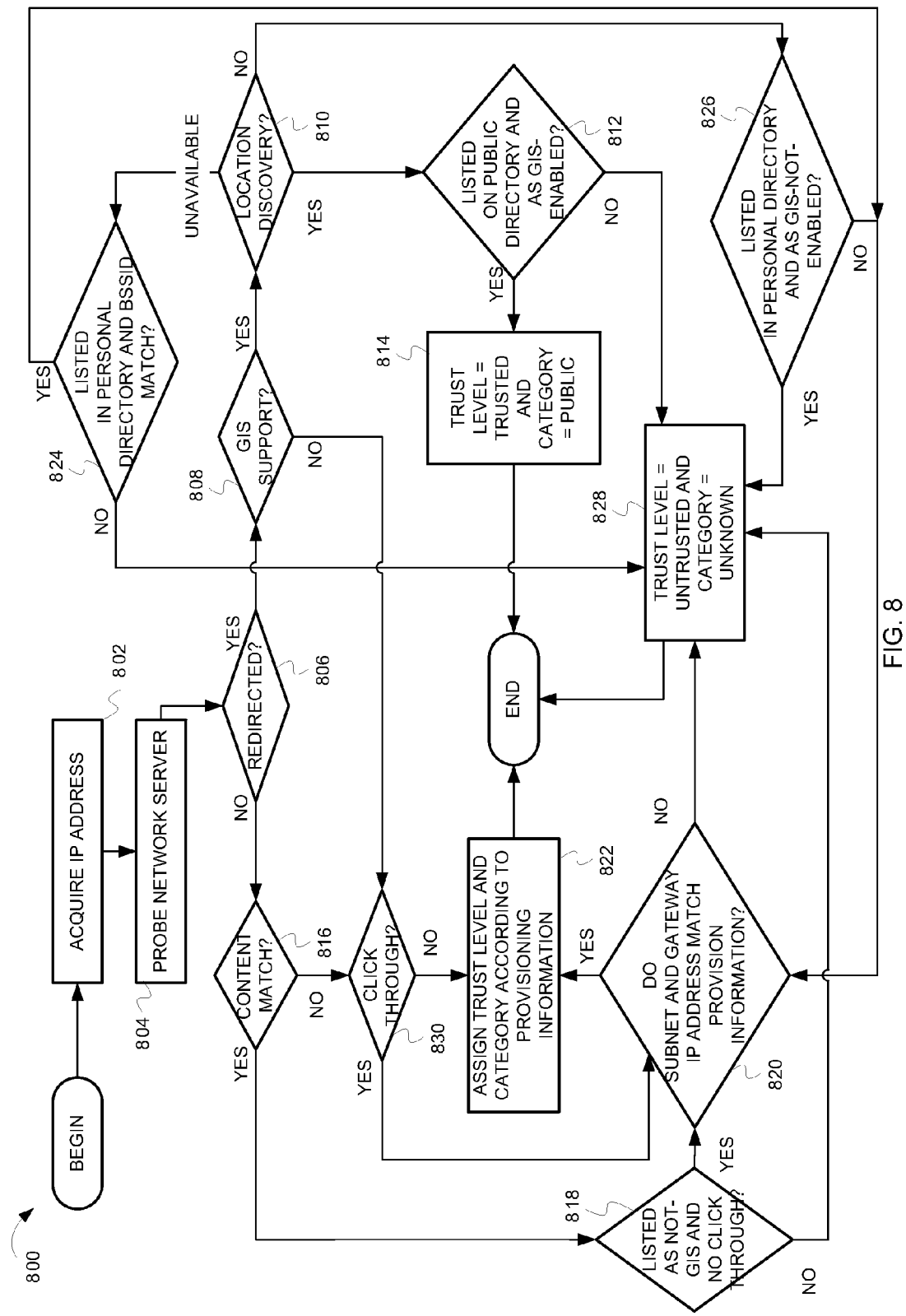
FIG. 8 is a flow diagram illustrating operations for characterizing a network based on network-layer interactions, according to some embodiments of the invention.

As noted in the discussion of FIG. 7, block 722 performs characterization operations at layer 3 (i.e., the network layer) of the network. FIG. 8 describes how some embodiments may perform network-layer characterization. This discussion continues with a description of FIG. 8.

FIG. 8 is a flow diagram illustrating operations for characterizing a network based on network-layer interactions, according to some embodiments of the invention. In FIG. 8, a flow 800 begins at block 802, where a connection agent (or another component) acquires an Internet Protocol (IP) address. The flow continues at block 804. Although not shown, if the connection agent cannot acquire an IP address, the flow ends.

At block 804, the connection agent probes a network server. For example, the connection agent sends an HTTP request to a known server, such as a server maintained by iPass, Inc. of Redwood City, Calif. In some embodiments, the server is guaranteed to be online and not cached. The flow continues at block 806.

At block 806, the connection agent determines whether the probe was redirected to a gateway. For example, the connection agent's HTTP request may have been redirected to a gateway that performs authentication before allowing access to the Internet. If the network probe was redirected, the flow continues at block 808. Otherwise, the flow continues at block 816.

At block 808, after being redirected to a gateway, the connection agent determines whether the gateway supports Generic Interface Specification (GIS). In some instances, the connection agent and gateway exchange HTML documents. The connection agent can detect GIS support by detecting an HTML tag associated with GIS. If the gateway supports GIS, the flow continues at block 810. If the gateway does not support GIS, the flow continues at block 824.

At block 810, the connection agent determines whether the gateway supports location discovery. Location discovery is a function by which the connection agent transmits a "dummy" authentication request to the gateway. The gateway responds to the dummy authentication request with location information, such as street address, company name, telephone number, or other information about the network and its location. If the gateway supports location discovery, the flow continues at block 812. If the gateway does not support location discovery, the flow continues at block 826. In yet another possibility, if the connection agent itself does not support location discovery, the flow continues at block 824.

After determining that the gateway supports location discovery, the flow continues at block 812. At block 812, the connection agent determines whether provisioning information indicates that the network is listed in the public directory, and that the network is GIS-enabled. If the provisioning information indicates the network is listed in the public directory and GIS-enabled, the flow continues at block 814. Otherwise, the flow continues at block 828. At block 814, the connection agent determines that the network is a trusted, public network. At block 828, the connection agent determines that the network is un-trusted and unknown. From blocks 814 and 828, the flow ends.

As noted, if the connection agent itself does not support location discovery, the flow continues at block 824. At block 824, the connection agent determines whether the network is listed in the personal directory, and the network's BSSID matches provisioning information. If not, the connection agent determines a network is unknown and un-trusted (see block 828). Otherwise, the flow continues at block 820. At block 820, the connection agent determines whether the network's subnet mask and gateway IP address match provisioning information. If so, the connection agent assigns the category and trust level to be those indicated in the provisioning information (e.g., known and trusted) (see block 822). However, if the addresses do not match, the flow continues at block 828, where the connection agent determines that the network is unknown and un-trusted.

Referring back to block 806, if the connection agent is not redirected to a gateway, the flow continues at block 816. At block 816, the connection agent determines whether it has received content from the website that it probed. For example, the connection agent determines whether it has received content from the iPass website. If the connection agent received content from the website that it probed, the flow continues at block 818. At block 818, the connection agent determines whether the network is not GIS-enabled and not click-through-enabled. If so, the flow continues at block 828, where the connection agent determines a network is un-trusted and unknown. Otherwise, the flow continues at block 820 (see description of block 820 above).

Referring back to block 816, if the connection agent does not receive content from the website it probed at 804, the flow continues at block 830. At block 830, the connection agent determines whether the website is click-through-enabled. If so, the flow continues at block 820. Otherwise, the flow continues at block 822. The operations at blocks 820 and 822 are described above.

After completing the flow 800, the connection agent has performed operations for characterizing the network based on interactions at the network layer. In some embodiments, the connection agent uses results from the network-layer characterization in other characterization flows, such as the flow for characterizing a Wi-Fi network (see block 722 of FIG. 7).

This discussion continues with a description of operations for characterizing 3G and 4G networks.

Figure 9:
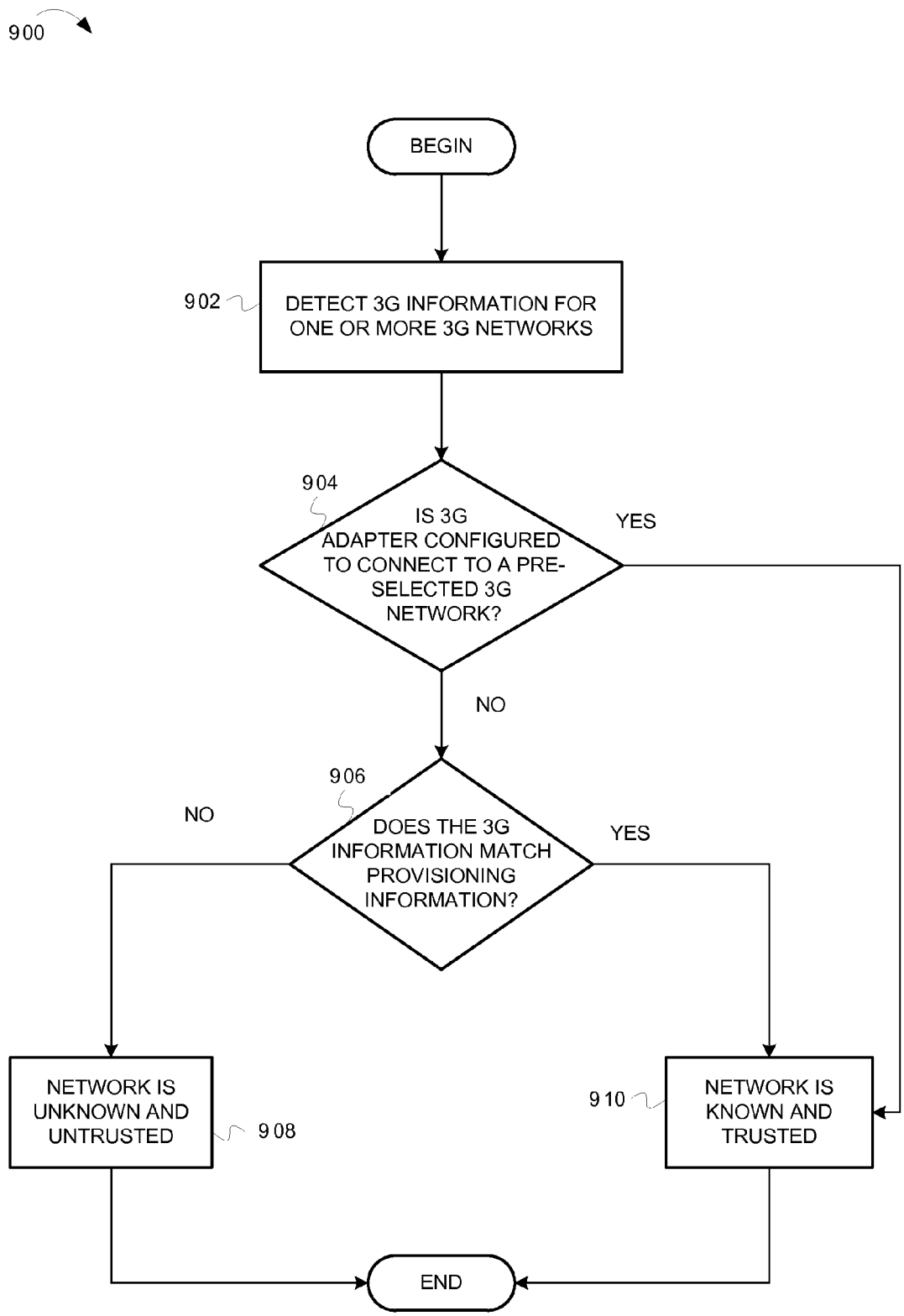
FIG. 9 is a flow diagram illustrating operations for characterizing 3G networks, according to some embodiments of the invention.

FIG. 9 is a flow diagram illustrating operations for characterizing 3G networks, according to some embodiments of the invention. In FIG. 9, a flow 900 begins at block 902, where a connection agent detects 3G information for one or more 3G networks. The information can include a provider identifier, network identifier, etc. In some embodiments, the connection agent attempts to match the 3G information to entries in the public directory. The connection agent creates a list of one or more directory entries that match the 3G network information. The flow continues at block 904.

At block 904, the connection agent determines whether the computer's 3G adapter is configured to connect to a preselected 3G network. In some cases, 3G network providers configure 3G network adapters to automatically connect upon detecting the provider's 3G network identifier. Thus, when operational in the field, such adapters automatically connect to particular 3G networks. If the adapter is configured to connect to a pre-selected 3G network, the flow continues at block 910. At block 910, the connection agent determines that the network to which the adapter connected is a public, trusted network. Thus, the connection agent modifies the list entry (i.e., the entry in the list created at block 902) to indicate that the 3G network is a public, trusted network. From block 910, the flow ends.

However, if the adapter is not configured to automatically connect to a pre-selected 3G network, the flow continues at block 906. At block 906, the connection agent determines whether the 3G information, received at block 902, matches provisioning information. For example, for each entry in the list, the connection agent compares a provider identifier and network identifier to provisioning information. If the information matches, the connection agent determines the 3G network is a public, trusted network (see block 910). If the information does not match, the connection agent determines the 3G network is an unknown, untrusted network.

As noted above, the network information detected at block 902 may match multiple entries in the public directory. Thus, the connection agent creates a list of matching entries, and then processes the list. After the flow 900, the list may include more than one entry. Thus, the connection agent may select and return one entry from the list, where the selected entry indicates a trust level and category for the network. In some embodiments, the trust level and category are used in the flow 400 of FIG. 4 (e.g., at block 424). The selection process may consider security policies and other factors. In some embodiments, the connection agent selects the list entry having the highest trust level (e.g., a network that is known and trusted) and returns that list entry. The following flows can also make similar selections.

Figure 10:
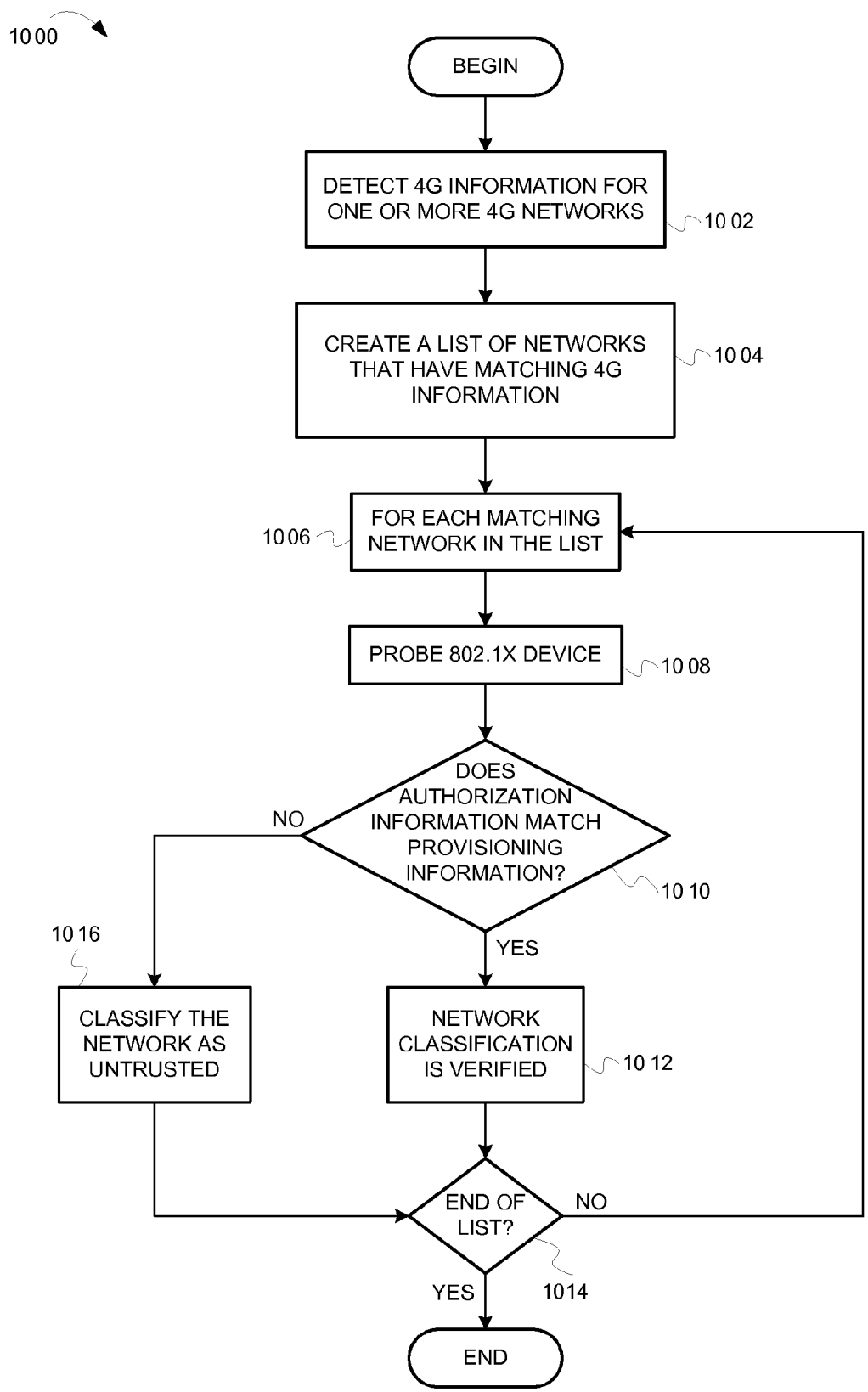
FIG. 10 is a flow diagram illustrating operations for characterizing 4G networks, according to some embodiments of the invention.

FIG. 10 is a flow diagram illustrating operations for characterizing 4G networks, according to some embodiments of the invention. In FIG. 10, the flow begins at block 1002, where the connection agent detects information about one or more 4G networks. In some embodiments, the 4G network information can include an SSID, network identifier, etc. the flow continues at block 1004.

At block 1004, the connection agent matches the 4G network information with provisioning information. In some embodiments, the connection agent compares the 4G information to the public directory. In turn, the connection agent creates a list of matching directory entries. The flow continues at block 1006.

At block 1006, the connection agent begins a loop in which it will process each matching entry in the list. The flow continues at block 1008, where the connection agent probes and 8021.X device. For example, the connection agent attempts to authenticate with an 8021.X server, using provisioning information (e.g., a password from the directory entry). The flow continues at block 1010.

At block 1010, the connection agent determines whether the authentication information was accepted by the 8021.X server. If so, the flow continues at block 1012. At block 1012, the connection agent determines that the network is a public, trusted network.

If the authentication information was not accepted by the 8021.X server, the connection agent determines that the network is unknown and untrusted (see block 1016). From block 1016, the flow continues at block 1014, where it ends if it has reached the end of the list of matching directory entries. If there are more matching directory entries to process, the flow continues at block 1006. After performing the flow 1000, the connection agent can select one of the list entries to return, such as for processing in the flow 400 of FIG. 4.

In the discussion above, the flow diagrams describe receiving or detecting network information. For example, see the operations at blocks 902 and 1002. For such operations, some embodiments receive/detect the network information by performing operations in FIG. 4 (e.g., at block 402). Other embodiments perform other operations to receive or detect the network information.

Thus far, the flow diagrams have described operations for characterizing wireless networks, such as Wi-Fi, 3G, and 4G. However, some embodiments can characterize wireless and wired networks. This discussion continues with a description of how some embodiments may characterize Ethernet networks and other wired networks.

Figure 11:
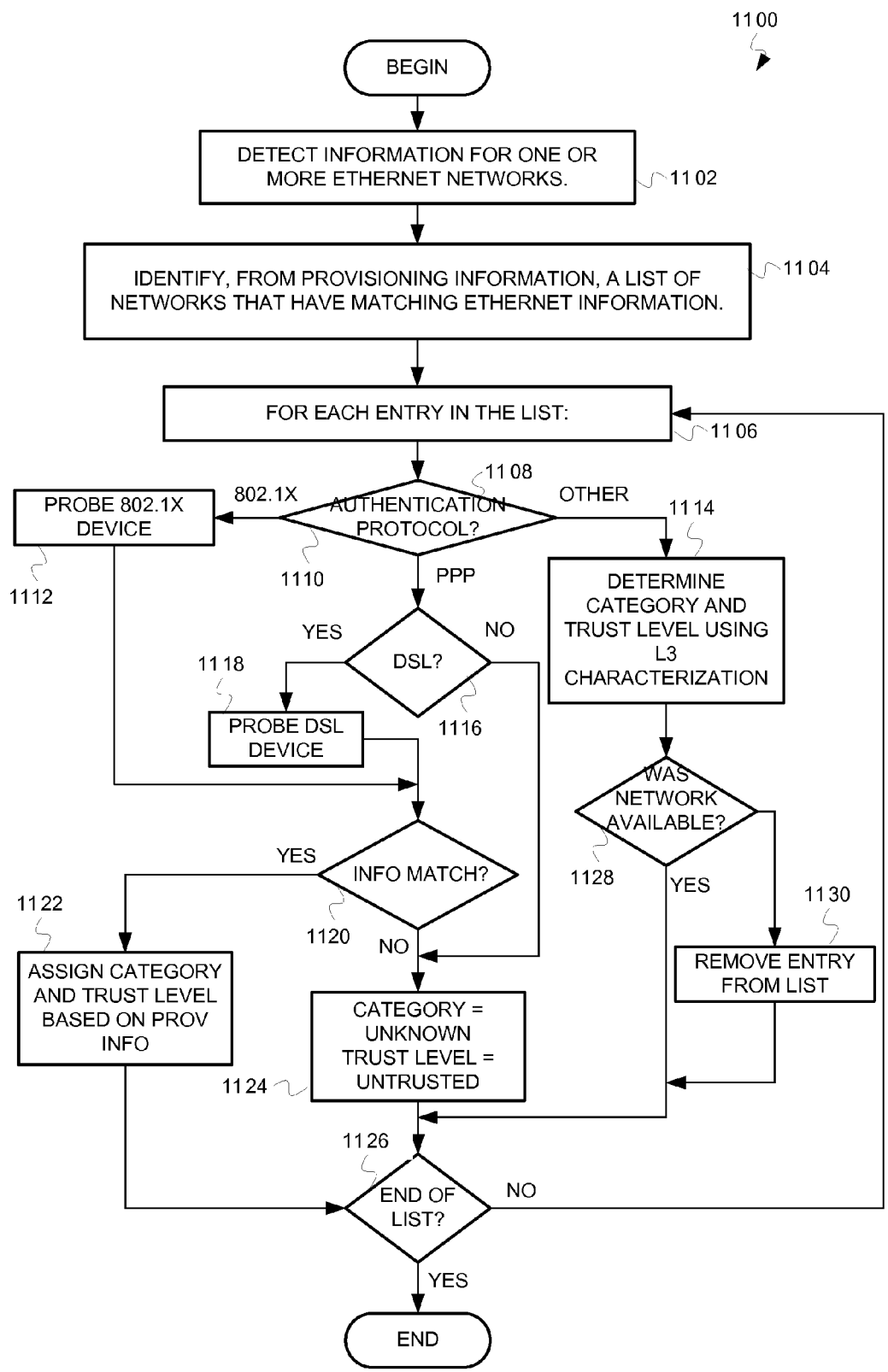
FIG. 11 is a flow diagram illustrating operations for characterizing Ethernet and digital subscriber line (DSL) networks, according to some embodiments of the invention.

FIG. 11 is a flow diagram illustrating operations for characterizing Ethernet and digital subscriber line (DSL) networks, according to some embodiments of the invention. In FIG. 11, a flow 1100 begins at block 1102, where a connection agent detects information about one or more Ethernet and DSL networks. The flow continues at block 1104.

At block 1104, the connection agent searches provisioning information for matching networks. For example, the connection agent may search the personal directory, campus directory, and public directory for network entries associated with Ethernet and DSL networks. In some instances, the connection agent looks for directory entries that have a media type of Ethernet (or DSL), and that support 8021.X or PPP. In turn, the connection agent creates a list of matching directory entries. The flow continues at block 1106.

Beginning at block 1106, the flow 1100 performs a loop that processes each of the matching directory entries in the list. The flow continues at block 1108. At block 1108, the connection agent determines, based on provisioning information, whether the network is expected to support 8021.X. If the network is expected to support 8021.X, the flow continues at block 1112. At block 1112, the connection agent probes and 8021.X server to determine whether it will accept authentication credentials stored in the provisioning information. If the 8021.X accepts the credentials, the network's category and trust level are those indicated in the provisioning information (see blocks 1120 and 1122). For example, if the matching directory entry indicates the network is public and trusted, the connection agent assigns the network's category to public and trust level to trusted. If the 8021.X server does not accept the authentication information, the connection agent assigns the network's trust level to untrusted and category to unknown (see blocks 1120 and 1124). Blocks 1120 and 1124 continue at block 1126, which loops back to 1106 if there are more list entries to process. If there are no more list entries to process, the flow ends.

Referring back to block 1108, if the list entry indicates that the network employees PPP, the flow continues at block 1116. At block 1116, if the network is a DSL network, the flow continues at block 1118. Otherwise, the flow continues at block 1100 work. At block 1118, the connection agent probes DSL network using authentication information in the matching list entry. If the network accepts the authentication information, the connection agent assigns the network's category and trust level based on what is in the provisioning information (i.e. the trust level and category noted in the matching list entry) (see blocks 1120 and 1122). Otherwise, the connection agent assigns the network entry's category to unknown, and its trust level to untrusted (see blocks 1120 and 1124). As noted above, blocks 1120 and 1124 continue at block 1126. Block 1126 loops back to 1106 if there are more list entries to process. Otherwise the flow 1100.

Referring back to block 1108, if the list entry indicates that the network employs a protocol other than PPP, the flow continues at block 1114. At block 1114, the connection agent determines a network's trust level and category by interacting with the network at layer 3 (i.e., network layer). In some embodiments, the connection agent does this by performing the operations shown in FIG. 8. If the connection agent attempts layer 3 operations but finds that no network is available (see block 1128), the connection agent removes the entry from the list of matching entries (see block 1130). From block 1130, the flow continues at block 1126.

Figure 12:
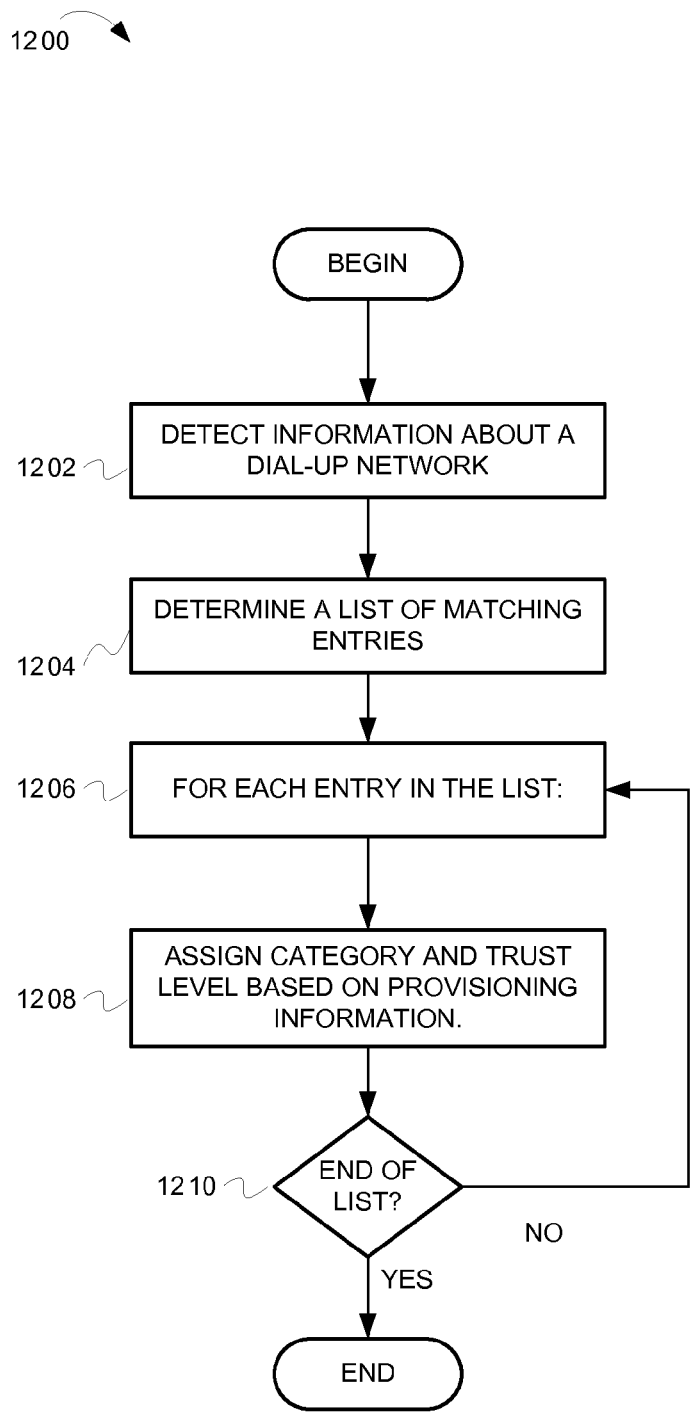
FIG. 12 is a flow diagram illustrating operations for characterizing dial-up, GSM, ISDN, and PHS networks, according to some embodiments of the invention.

FIG. 12 is a flow diagram illustrating operations for characterizing dial-up, GSM, ISDN, and PHS networks, according to some embodiments of the invention. Although FIG. 12 describes operations for a plurality of network media types, for clarity, the following discussion will only refer to dial-up networks. In FIG. 12, a flow 1200 begins at block 1202, where a connection agent detects information from a dial-up network. The connection agent may receive this information from a dial-up adapter. The information can includes geographical context information, such as latitude, longitude, altitude, zip code, county, country, city, state, continent, etc. In some embodiments, the geographical context information is received or otherwise determined by another device, such as a global positioning system device. The flow continues at block 1204.

At block 1204, the connection agent creates a list of networks that have matching provisioning information. For example, the connection agent searches the public directory and campus directory for entries whose media type is dial-up, and his geographic context matches that detected at block 1202. Although not shown, if no directory entries match, the flow ends. Otherwise, the flow continues at block 1206.

At block 1206, the flow 1200 begins a loop for processing the matching directory entries. The flow continues at block 1208, where the connection agent assigns a category and trust level based on provisioning information. For example if the matching entry indicates the dial-up network is public and trusted, the connection agent assigns the category and trust level as such. The flow continues at block 1210.

At block 1210, if the connection agent has processed all entries in the list, the flow ends. Otherwise the flow continues at block 1206.

In the FIGS. 7-12, when the connection agent probes or otherwise interacts with a network, it can store the result in a result cache. If there are multiple directory matches, after probing for the first match, the connection agent can avoid interacting with the network by using information in the result cache.

GENERAL

This description describes numerous details about embodiments of the invention. However, some embodiments may be practiced without these specific details. In some instances, for sake of clarity, this description omits well-known circuits, structures and techniques. In this description, references to "one embodiment" or "an embodiment" mean that a feature is included in at least one embodiment of the invention. Furthermore, separate references to embodiments do not necessarily refer to the same embodiment. Thus, the present invention can include any combination of the embodiments described herein.

The invention claimed is:

1. A method for selecting a network on a computing device, the method comprising:
    detecting, via at least one processor of the computing device, network information about a first network that available for connection;
    comparing the network information to network provisioning information that originates from a trusted source;
    adding a network identifier associated with the first network to an available networks list indicating a plurality of available networks;
    identifying trusted networks in the available networks list;
    ranking the trusted networks forming a ranked trusted network list;
    presenting the ranked trusted network list in a graphical user interface;
    receiving user input selecting a connection network from the ranked trusted networks list;
    probing the connection network without connecting to the connection network, wherein the probing reveals additional information about the connection network;
    comparing the additional information to the provisioning information;
    if the additional information matches a portion of the provisioning information, updating a venue cache with the additional information; and
    connecting to the connection network; and
    if the additional information does not match a portion of the provisioning information, refusing connection to the connection network.

2. The method of claim 1, wherein the venue cache stores trusted information collected during previous network connections.

3. The method of claim 1, wherein the ranking is based on connection history, and wherein the ranking orders the available networks list from best to worst based on connection history with previously available networks.

4. A non-transitory machine readable medium including program code executable on a processor, the program code for selecting a network'on a computing device, the program code including:
- program code for detecting, via at least one processor of the computing device, network information about a first network that available for connection;
- program code for comparing the network information to network provisioning information that originates from a trusted source;
- program code for adding a network identifier associated with the first network to an available networks list indicating a plurality of available networks;
- program code for identifying trusted networks in the available networks list;
- program code for ranking the trusted networks forming a ranked trusted network list;
- program code for presenting the ranked trusted network list in a graphical user interface;
- program code for receiving user input selecting a connection network from the ranked trusted networks list;
- program code for probing the connection network without connecting to the connection network, wherein the probing reveals additional information about the connection network;
- program code for comparing the additional information to the provisioning information;
- program code for, if the additional information matches a portion of the provisioning information, updating a venue cache with the additional information and connecting to the connection network; and
- program code for, if the additional information does not match a portion of the provisioning information, refusing connection to the connection network.

5. The method of claim 4, wherein the venue cache stores trusted information collected during previous network connections.

6. The method of claim 4 wherein the ranking is based on connection history, and wherein the ranking orders the available networks list from best to worst based on connection history with previously available networks.

7. An apparatus comprising:
a processor;
a non-transitory machine readable medium including program code executable on the processor, the program code for selecting a network on a computing device, the program code including:
- program code for detecting, via at least one processor of the computing device, network information about a first network that available for connection;
- program code for comparing the network information to network provisioning information that originates from a trusted source;
- program code for adding a network identifier associated with the first network to an available networks list indicating a plurality of available networks;
- program code for identifying trusted networks in the available networks list;
- program code for ranking the trusted networks forming a ranked trusted network list;
- program code for presenting the ranked trusted network list in a graphical user interface;
- program code for receiving user input selecting a connection network from the ranked trusted networks list;
- program code for probing the connection network without connecting to the connection network, wherein the probing reveals additional information about the connection network;
- program code for comparing the additional information to the provisioning information;
- program code for, if the additional information matche a portion of the provisioning information, updating a venue cache with the additional information and connecting to the connection network; and
- program code for, if the additional information does not matches a portion of the provisioning information, refusing connection to the connection network.

8. The method of claim 7, wherein the venue cache stores trusted information collected during previous network connections.

9. The method of claim 7 wherein the ranking is based on connection history, and wherein the ranking orders the available networks list from best to worst based on connection history with previously available networks.

* * * * *